(12) United States Patent
Nakamiya et al.

(10) Patent No.: US 7,876,527 B2
(45) Date of Patent: Jan. 25, 2011

(54) MAGNETIC DISK DEVICE

(75) Inventors: Teruhiro Nakamiya, Kanagawa-ken (JP); Hitoshi Shindo, San Jose, CA (US); Takako Hayakawa, Kanagawa (JP); Kouki Uefune, Kanagawa (JP)

(73) Assignee: Hitachi Global Storage Technologies, Netherlands, B.V., Amsterdam (NL)

(*) Notice: Subject to any disclaimer, the term of this patent is extended or adjusted under 35 U.S.C. 154(b) by 826 days.

(21) Appl. No.: 11/811,383

(22) Filed: Jun. 7, 2007

(65) Prior Publication Data

US 2008/0024908 A1    Jan. 31, 2008

(30) Foreign Application Priority Data

Jun. 7, 2006    (JP) .............................. 2006-158277

(51) Int. Cl.
*G11B 33/14*    (2006.01)
(52) U.S. Cl. .................................... 360/97.02
(58) Field of Classification Search ....................... None
See application file for complete search history.

(56) References Cited

U.S. PATENT DOCUMENTS

| | | | |
|---|---|---|---|
| 5,110,307 A | | 5/1992 | Rapoza |
| 5,337,202 A | * | 8/1994 | Jabbarai et al. .......... 360/97.01 |
| 5,541,787 A | * | 7/1996 | Jabbari et al. ............ 360/97.01 |
| 5,931,697 A | | 8/1999 | Jeong |
| 6,327,814 B1 | * | 12/2001 | Tsujino et al. .............. 439/374 |
| 6,392,838 B1 | | 5/2002 | Hearn et al. |
| 6,566,776 B2 | | 5/2003 | Hoffmann et al. |
| 7,137,196 B2 | * | 11/2006 | Gunderson et al. ............ 29/884 |
| 2005/0068666 A1 | | 3/2005 | Albrecht et al. |

FOREIGN PATENT DOCUMENTS

| | | |
|---|---|---|
| GB | 2317745 | 4/1998 |
| JP | 07-262765 | 10/1995 |
| JP | 2004-014826 | 1/2001 |

* cited by examiner

*Primary Examiner*—David D Davis

(57) ABSTRACT

Embodiments in accordance with the present invention improve bonding reliability in a feedthrough sealing portion. According to one embodiment of the present invention, an opening of a through hole is provided on the bottom of the base of the magnetic disk device and a feedthrough mounting plane which is one of the steps formed toward the outside of the device is provided around the opening. The feedthrough includes a flange and pins which are fixed to the flange by a glass material and pass an electric signal. The flange is larger in outer shape than the opening of the base. The periphery of the flange of the feedthrough is mounted on the feedthrough mounting plane of the base from the outside and bonded thereto by solder.

10 Claims, 12 Drawing Sheets

|     | stress at solder portion | stress at glass portion |
|-----|--------------------------|-------------------------|
| (1) | 100                      | 100                     |
| (2) | 90                       | 95                      |
| (3) | 87                       | 91                      |

US 7,876,527 B2

MAGNETIC DISK DEVICE

The instant nonprovisional patent application claims priority to Japanese Patent Application No. 2006-158277 filed Jun. 7, 2006 and incorporated by reference in its entirety herein for all purposes

BACKGROUND OF THE INVENTION

Recently, there have been demands for a magnetic disk device to have large capacity, high recording density and high access. To meet these demands, a disk and a head gimbal assembly are rotated and driven at a high speed respectively, which creates a certain amount of air turbulence, thereby producing vibration in the disk and head gimbal assembly. The turbulence vibration hinders a head from being positioned on a high-density recorded disk data. The reason is that air turbulence is randomly created, which makes it difficult to estimate its size and period, making it complicated and difficult to control a quick and accurate positioning. In addition, the turbulence vibration produces noise, which leads to a loss of the quietness of the device.

Aside from the above, the air turbulence created by a high speed rotation in the device causes a problem with increase in consumption power. The rotation of a disk at a high speed involves and rotates air around the disk. On the other hand, air away from the disk is stationary, generating a shearing force therebetween which turns into a load to stop the rotation of the disk. This is referred to as "windage loss," and the faster the disk rotates, the greater the loss. Rotating the disk at a high speed against the windage loss requires a motor to deliver a large output, which needs a large electric power in turn.

While attention is focused on the turbulence and windage loss being proportional to the density of gas in the device, there has been an idea that low-density gas instead of air is sealed in a hermetically sealed magnetic disk device to decrease the turbulence and windage loss. Hydrogen and helium are candidates as low-density gases. Taking into account its practical use, helium is optimal as it is more effective, stabler, and safer. A magnetic disk device in which helium gas is hermetically sealed, can solve the above problem and realize a quick and accurate positioning, saving power and sufficient quietness. However, there has been a problem in that helium readily leaks out during use from a housing used in an ordinary magnetic disk device inferior in hermetic because helium is very small in molecule and large in diffusion coefficient.

U.S. Patent Publication No. 2005/0068666 ("Patent Document 1"), for example, discloses a technique which enables low-density gas such as leaky helium, to be hermetically sealed. FIG. 10 is a cross section of the hermetically sealed magnetic disk device described in Patent Document 1. A head disk assembly 31 is fixed to a base 32 and sealed into a housing with a cover 33. A part where helium in the housing is most apt to leak out is a junction 34 of the base 32 with the cover 33. The cover 33 is laser-welded or soldered to the upper part of the side wall of the base 32 at the junction 34.

Another place where helium in the housing is most apt to leak out is the opening of the base 32 to which a feedthrough 40 connecting an FPC assembly in the housing to a circuit board outside the housing is fitted. FIGS. 11 and 12 are a side view and top view of the feedthrough 40 respectively. The feedthrough 40 has a flange 41 and a plurality of pins 43 fixed to the flange 41 by a glass sealing material 44 and is fixed by bonding the flange 41 to the periphery of the opening in the bottom of the base 32 by solder.

However, solder used for bonding the feedthrough to the base is low in proof stress as material, so that it may not ensure sufficient bonding reliability depending on external force applied to a magnetic disk device or unexpected deformation caused by change in temperature environment while the magnetic disk device is used.

BRIEF SUMMARY OF THE INVENTION

Embodiments in accordance with the present invention provide improve bonding reliability in a feedthrough sealing portion. According to the particular embodiments of FIGS. 1 and 3A, an opening 7 of a through hole is provided on the bottom of the base 2 of the magnetic disk device 20, and a feedthrough mounting plane 8 which is one of the steps formed toward the outside of the device, is provided around the opening 7. The feedthrough 1 includes a flange 4 and pins 3 which are fixed to the flange 4 by a glass material 5 and pass an electric signal. The flange 4 is larger in outer shape than the opening 7 of the base 2. The periphery of the flange 4 of the feedthrough 1 is mounted on the feedthrough mounting plane 8 of the base 2 from the outside and bonded thereto by solder.

DETAILED DESCRIPTION OF THE INVENTION

Embodiments in accordance with the present invention relate to a magnetic disk device, and in particular, to a hermetically sealed magnetic disk device suited for sealing low-density gas such as helium gas therein.

Embodiments of the present invention has been made in view of the above background and aim to provide a way of improving bonding reliability in a feedthrough sealing portion.

A magnetic disk device according to embodiments of the present invention includes a disk, a spindle motor which rotationally drives the disk, a head which records and reproduces information on the disk, an actuator assembly which moves the head over the disk in the direction of the radius thereof, a base provided with the head, spindle motor and actuator assembly and an FPC assembly which performs an electrical connection and a cover bonded to the base, the magnetic disk device being provided with space formed by bonding the cover to the base is filled with low-density gas, wherein a plane where the feedthrough is mounted is provided outside the device at the periphery of the opening to arrange a feedthrough including pins electrically connected to the FPC assembly and a flange to which the pins are fixed by a sealing material at an opening penetrating through the base provided therein, the flange of the feedthrough is made larger in outer shape than the opening and the periphery of the flange is bonded to the mounting plane from the outside of the device.

The mounting plane is provided in a position nearer to the inner side of the device than the center of the thickness of the base. The mounting plane is one of steps formed toward the outer side of the device when viewed from the opening. The flange preferably has a ditch on the plane of the periphery thereof inside the device. It is desirable that the base is made of aluminum die-cast, the flange is made of nickel alloy or stainless steel and the sealing material is made of glass or ceramic. The low-density gas is preferably helium.

According to the structure of embodiments of the present invention, stress caused by external force applied to a magnetic disk device or deformation caused by change in temperature environment while the magnetic disk device is used and applied to a solder bonding portion can be reduced, which greatly improves bonding reliability in a sealing portion.

Furthermore, according to the structure of embodiments of the present invention, flux supplying for soldering and cleaning can be conduced from the outside the device, which is excellent in workability and soldering quality. Flux residue can be easily removed from the outside.

Figure 3:
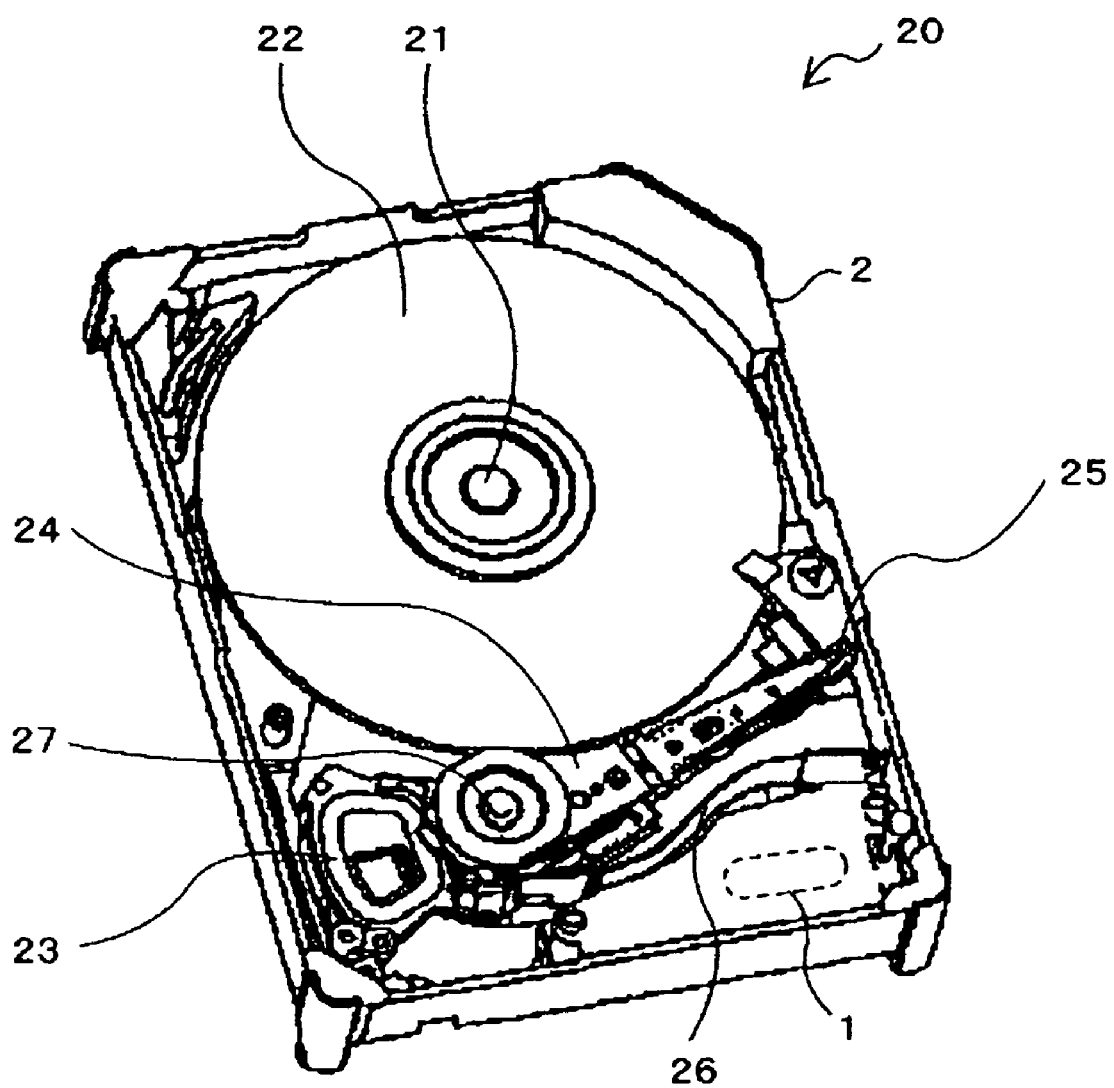
FIG. 3A is a top view of a hermetically sealed magnetic disk device in the embodiments to which a feedthrough mounting structure is applied.
FIG. 3B is a partial cross section of the hermetically sealed magnetic disk device shown in FIG. 3A.
Figure 3:
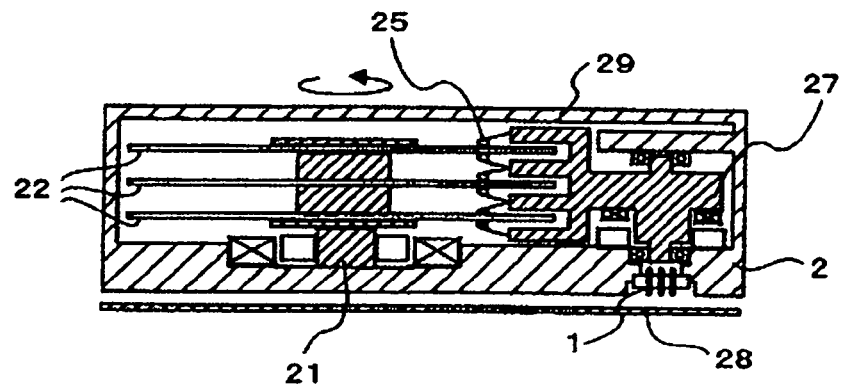

A desirable mode for carrying out the invention is described below with reference to the drawings. FIG. 3A is a top view of a hermetically sealed magnetic disk device without a cover for a housing thereof according to embodiments of the present invention. FIG. 3B is a partial cross section of the magnetic disk device to which the cover is fixed. In FIGS. 3A and 3B, the base 2 is a box-shaped housing with a bottom portion and a side wall. A spindle motor 21 is fixed to the bottom portion of the base 2. A magnetic disk 22 is attached to the rotating part of the spindle motor 21 and rotationally driven. In addition, a pivot 27 is fixed to the bottom portion of the base 2. An actuator assembly 23 including a voice coil motor and a head gimbal assembly 24 rotationally driven by the actuator assembly 23 are pivotally supported by the pivot 27. A slider with an air bearing surface (ABS) is attached to the distal end of the head gimbal assembly 24. A magnetic head 25 for recording and reproducing information together with the magnetic disk 22 is mounted on the slider. The head gimbal assembly 24 is rotated in the radial direction of the magnetic disk 22 and the magnetic head 25 is positioned on a recording track on the magnetic disk 22 to perform recording and reproduction. Furthermore, a flexible printed circuit (FPC) assembly 26 connecting the magnetic head and the motors to a control circuit mounted on a circuit board 28 attached outside the housing is provided to transfer information recorded and reproduced by the magnetic head 25 and a signal for driving the motors. A head disc assembly (hereinafter referred to as "HDA") composed of the spindle motor 21, the magnetic disk 22, the actuator assembly 23, the head gimbal assembly 24 and the FPC assembly 26 in the above housing and the circuit board 28 outside the housing function as a magnetic disk device.

A cover 29 is fixed in an atmosphere of helium to hermetically seal helium in the housing on which the HDA is mounted. When the cover 29 is fixed to the base 2 by laser-welding or soldering, materials for the base 2 and the cover 29 need to be selected from the standpoint of durability, reliability and cost. For example, it is desirable to select either the base 2 molded by aluminum die cast and the aluminum cover 29 formed by press or cutting, or the base 2 formed of aluminum alloy with a relatively small content of copper and magnesium by cold forging and the aluminum cover 29 formed by press or cutting. The housing is filled with helium gas at the same time when the cover 29 is fixed, thus the hermetically sealed magnetic disk device 20 is produced.

The feedthrough 1 having pins for electrically connecting the FPC assembly and a flange, is shown in FIGS. 3A and 3B. The feedthrough 1 is disposed at the bottom of the base around the FPC assembly 26, as shown in the figures.

The bonding between the feedthrough and the base in the hermetically sealed magnetic disk device requires a high hermetic quality to hold sealed low-density gas. For this reason, the space between the feedthrough and the base is sealed by solder or the like. However, solder is lower in proof stress as material than general metal such as stainless steel, aluminum and others, so that it may break or crack depending on external force applied to a magnetic disk device or unexpected deformation caused by change in temperature environment while the magnetic disk device is used, which may not ensure sufficient sealing performance.

First, the structure of embodiments of the present invention for ensuring sealing performance against external force applied to a magnetic disk device is described.

Figure 2:
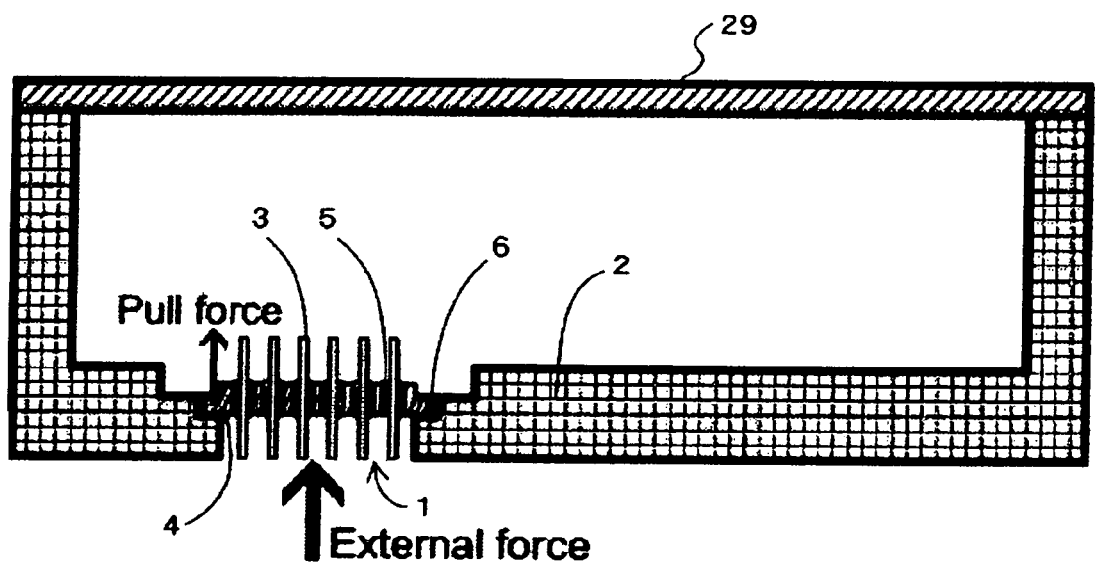
FIG. 2 shows a cross section of a portion where a feedthrough is mounted in a comparative example.

FIG. 2 shows a feedthrough mounted structure for comparison with that of embodiments of the present invention.

In FIG. 2, only feedthrough 1, base 2 and cover 29 are shown. The feedthrough 1 is fitted to the base 2 so as to hermetically seal the opening of the base 2 inside the housing. The flange 4 of the feedthrough 1 is larger in outer shape than the opening and the periphery thereof is bonded to a solder bonding portion 6 interposed between the periphery and the base 2 by soldering. As shown in FIG. 2, the feedthrough 1 is subjected to various external forces while the device is being manufactured and used, for example, when a card is connected to a steel pin 3 from the outside or atmospheric pressure in the housing is lowered. When pressed from the outside, the feedthrough 1 is subjected to force in the direction to which the solder bonding portion 6 is peeled away.

Thus, when the feedthrough is bonded to the base by solder inside the housing, as described above, solder is low in proof stress, so that it breaks or cracks at a junction when it is subjected to such a force as to peel the solder bonding portion, which may not ensure sufficient sealing performance.

When the feedthrough is bonded to the base by solder, flux supplying for soldering and cleaning is performed. In the structure shown in the above comparative example, however, such a supplying work needs to be done inside the housing, which is inferior in workability and adversely influences solder quality. Flux residue remaining inside the housing may exert an adverse influence on the HDA.

Figure 1:
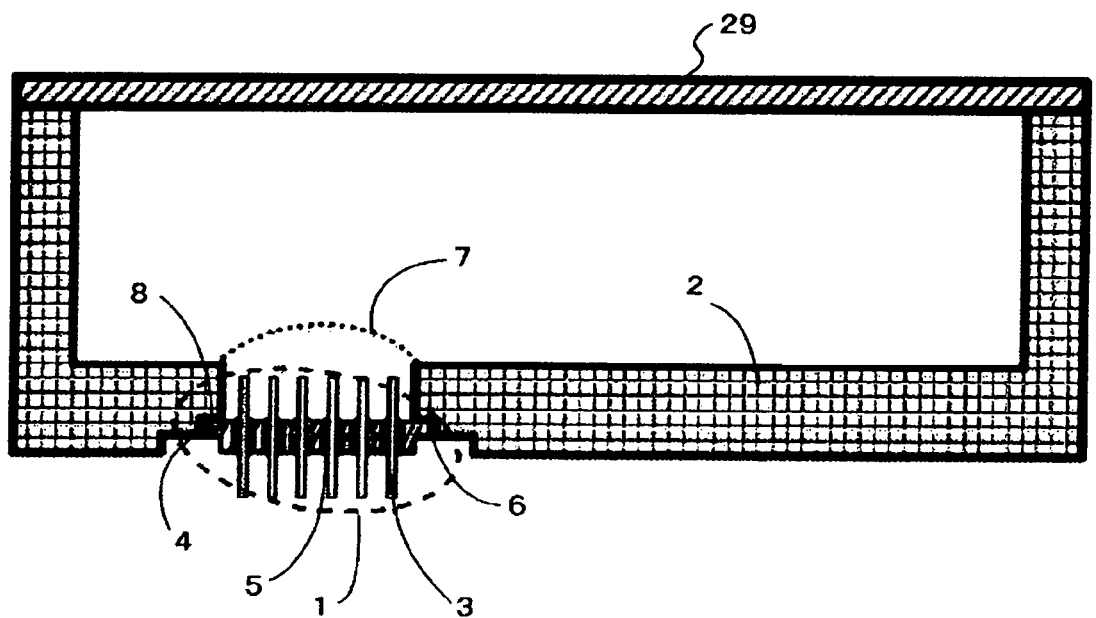
FIG. 1 shows a cross section of a portion where a feedthrough is mounted according to a first embodiment according to the present invention.
Figure 5:
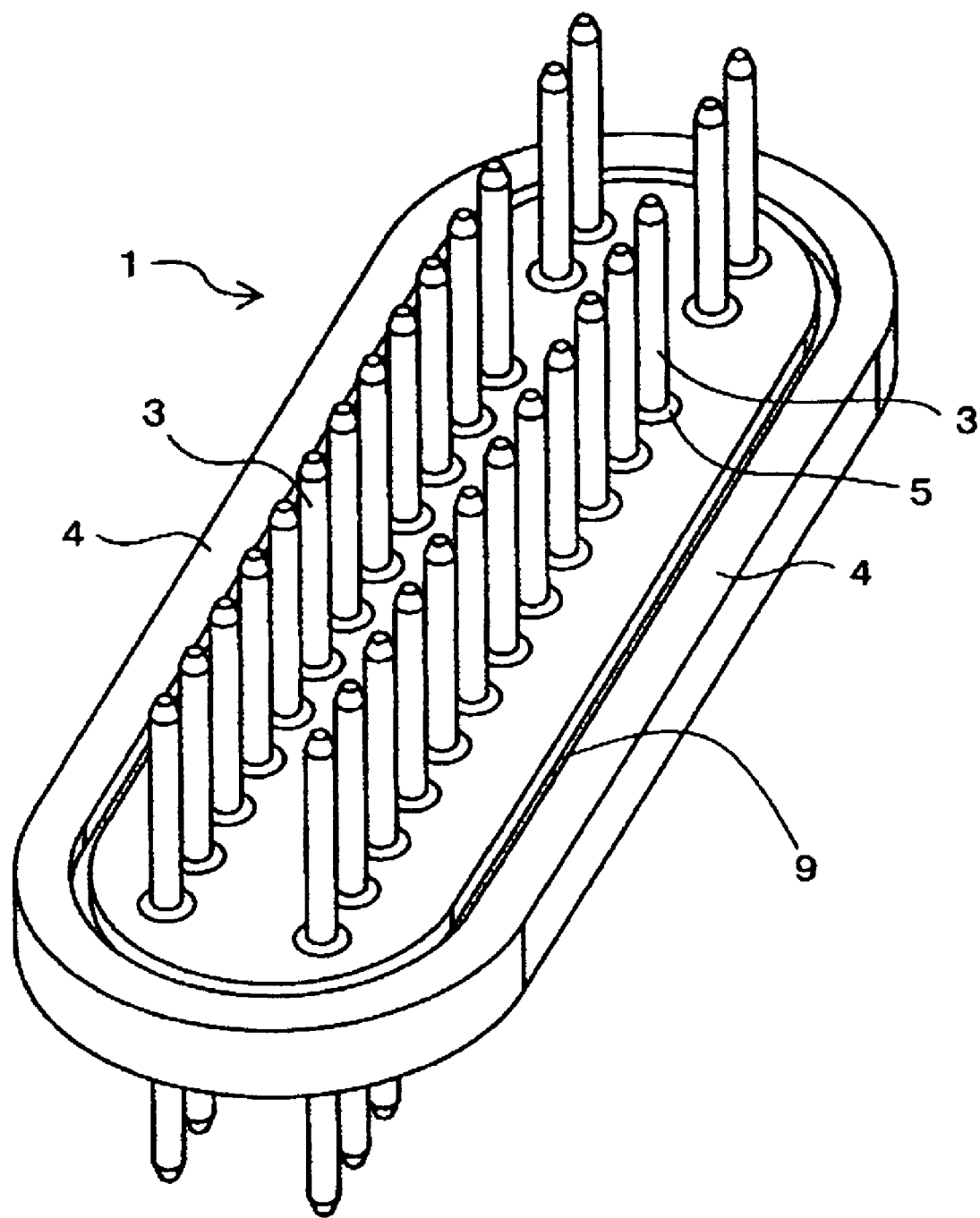
FIG. 5 shows a cross section of a portion where a feedthrough is mounted according to a third embodiment.

FIG. 1 shows a cross section of a portion where the feedthrough of the magnetic disk device according to the first embodiment of the present invention is mounted. In the figure, the HDA shown in FIG. 3A is omitted and the periphery of the feedthrough is enlarged. Incidentally, the feedthrough 1 is substantially the same in total configuration as that shown in the third embodiment in FIG. 5, so that reference to FIG. 5 is also made together. The feedthrough 1 has the flange 4 and a plurality of pins (steel pins) 3 held perpendicularly by the flange 4. The periphery of steel pins 3 is filled with a sealing material 5 such as glass, ceramic, to hermetically seal the space between the steel pins 3 and the flange 4. The material of the flange 4 conforms to that of seal 5 and the base 2, and is selected to reduce stress applied to a bonding position 8. When the base 2 is made of aluminum, the flange 4 is preferably made of nickel alloy or stainless steel.

As shown in FIG. 1, an opening 7 penetrating through the base 2 is provided in the bottom thereof, and a feedthrough mounting plane 8 is provided on the outside of the device around the opening 7. Specifically, the mounting plane is one of the steps formed toward the outside of the device when viewed from the opening 7. The feedthrough mounting plane 8 as bonding position is situated in a position closer to the outside of the device than the center of the thickness of the base 2. The flange 4 of the feedthrough 1 is larger in outer shape than the opening 7 of the base 2 and the periphery of the flange 4 is mounted on the feedthrough mounting plane 8 of the base 2 from the outside of the device and bonded thereon by solder.

According to the structure, since the feedthrough 1 is bonded to the base 2 from the outside of the device, a solder-bonding portion 6 is not subjected to such a force as to peel it off. In other words, even if a force is applied to the feedthrough 1 from the outside, the feedthrough 1 is subjected to such a force to press against a step of the mounting plane of the base 2 and not subject to such a force to peel it off because it is mounted from the outside of the device. This enhances bonding reliability in the solder-bonding portion.

According to the structure in FIG. 1, a flux supplying for soldering and cleaning can be done outside the device, which is excellent in workability and enables maintaining a good solder quality. Flux residue can be easily removed from the outside and never exert an adverse influence on the HDA inside the device.

Secondly, a first example of the structure of embodiments of the present invention is described which ensures sealing performance against deformation caused by change in temperature environment when the magnetic disk device is used.

Figure 6A:
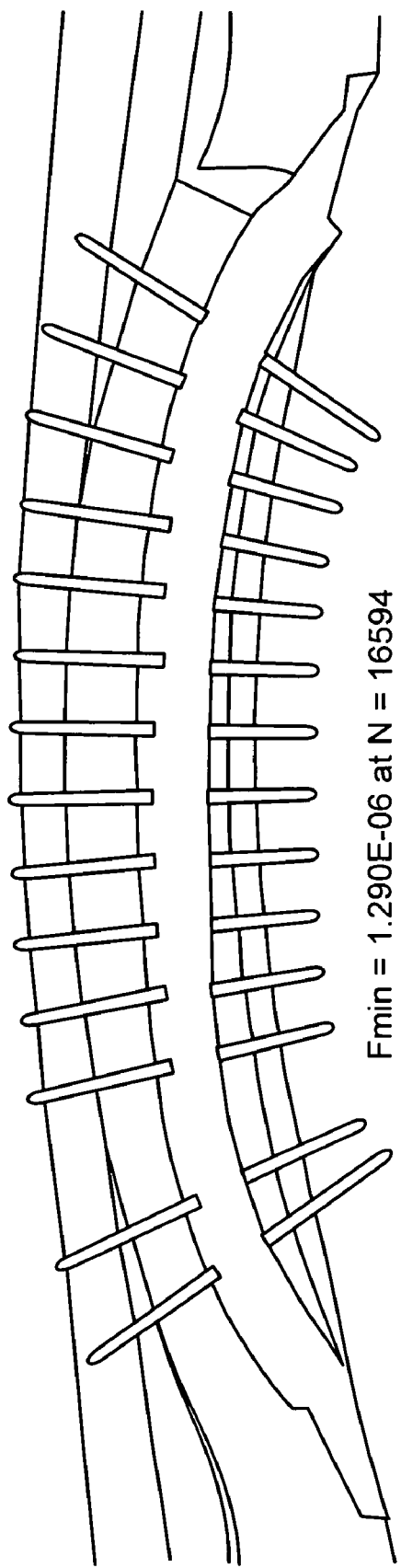
FIG. 6A shows results obtained by calculating deformation at a portion where a feedthrough is mounted in the first embodiment by a finite element method.
Figure 6:
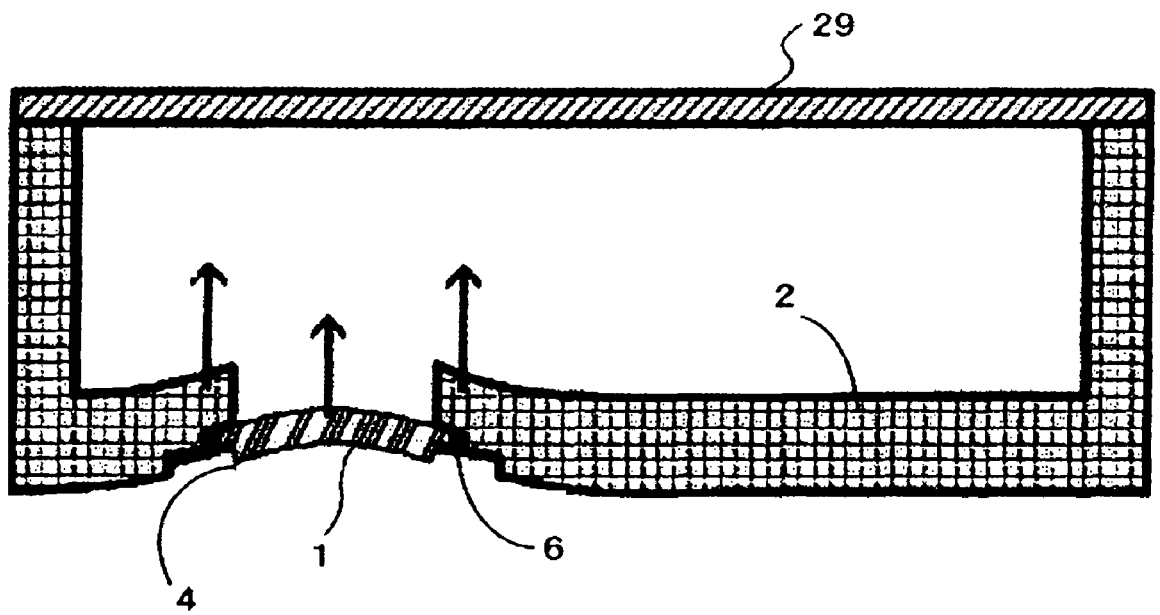
FIG. 6B is a schematic diagram on analytic results in FIG. 6A.

FIGS. 6A and 6B show the states that the feedthrough 1 and the solder-bonding portion 6 are deformed due to a change in temperature. FIG. 6A shows results obtained by a finite element method by calculating deformation for cases where temperature is changed from normal to high. FIG. 6B is a schematic diagram drawn to help readers easily understand analytic results shown in FIG. 6A. From FIGS. 6A and 6B, it can be seen that the feedthrough 1 is deformed toward the inside of the device at a high temperature. The reason is described below.

According to embodiments of the present invention, the SPCC used in the flange 4 of the feedthrough 1 is 13 to 17 ppm/deg. C. in thermal expansion coefficient. On the other hand, the aluminum die-cast material used in the base 2 is 20 ppm/deg. C. in thermal expansion coefficient. The base 2 made of aluminum die cast is higher in thermal expansion coefficient than the flange 4 made of nickel alloy. On the other hand, the base 2 is precluded from being deformed by the feedthrough 1 and the solder bonding portion 6 situated in a position closer to the outside of the device than the center of the thickness of the base 2. Let us consider the cases where ambient temperature rises to high at the time of using or transporting the magnetic disk device.

Although the base 2 is subjected to stress caused by the foregoing difference in thermal expansion coefficient at a high temperature from the flange, the base 2 is precluded from being deformed by the solder bonding portion 6 situated in the position closer to the outside of the device than the center of the thickness of the base 2, so that the stress acts toward the inside of the device rather than toward the center of the thickness of the base 2. As a result, the base 2 is deformed toward the inside of the magnetic disk device.

On the other hand, the feedthrough 1 is subjected to tensile force by the base 2 through the solder bonding portion 6 at a high temperature, which deforms also the feedthrough 1 toward the inside of the device.

Consequently, the solder bonding portion 6 is also subjected to stress according as the base 2 and the feedthrough 1 are deformed in the same direction.

As described above, when the bonding portion between the base 2 and the feedthrough 1 is situated in a position closer to the outside of the device than the center of the thickness of the base, the bonding portion with solder low in proof stress as material is subjected to stress, causing break or crack at the bonding portion, which may not keep sealing performance.

Figure 4:
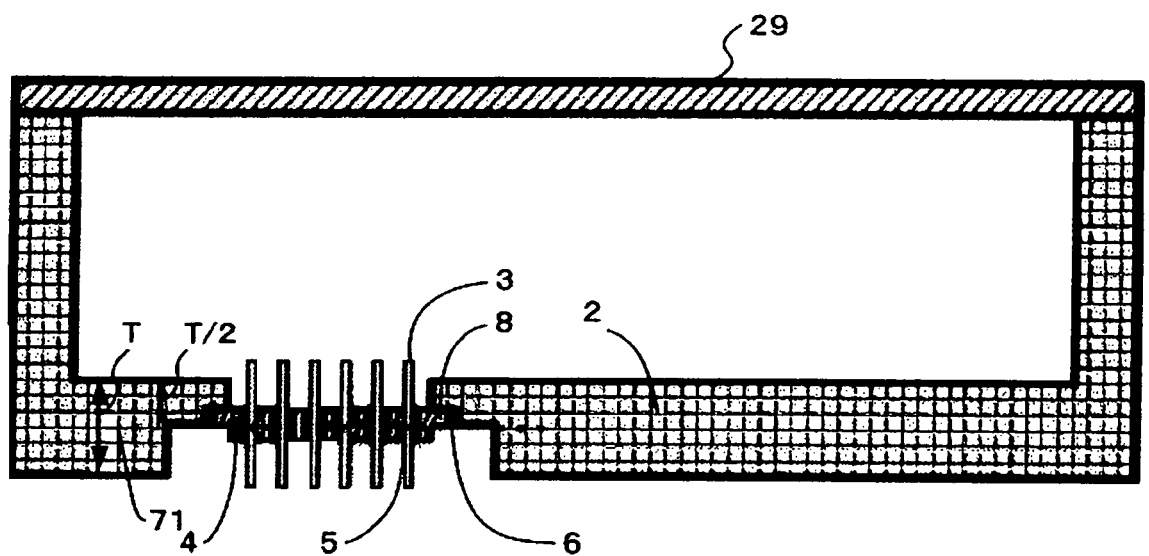
FIG. 4 shows a cross section of a portion where a feedthrough is mounted according to a second embodiment.

FIG. 4 shows a cross section of a portion where the feedthrough of the magnetic disk device according to the second embodiment of the present invention is mounted. Also in the figure, the HDA shown in FIG. 3B is omitted and the periphery of the feedthrough is enlarged. Incidentally, the feedthrough 1 is substantially the same in total configuration as that shown in FIG. 1.

As shown in FIG. 4, a step as the feedthrough mounting plane 8 is provided in a position closer to the inside of the device than the center 71 of thickness of the base 2, in other words, if the thickness of the base is taken to be T, the feedthrough mounting plane 8 is situated in the position closer to the inside of the device than the position of T/2.

According to the present structure, the feedthrough mounting plane 8 is provided in the position closer to the inside of the device than the center 71 of the thickness of the base 2, which enables changing the direction to which the base 2 is deformed to suppress deformation of the base 2 and the feedthrough 1 and stress applied to the solder bonding portion.

Figure 7A:
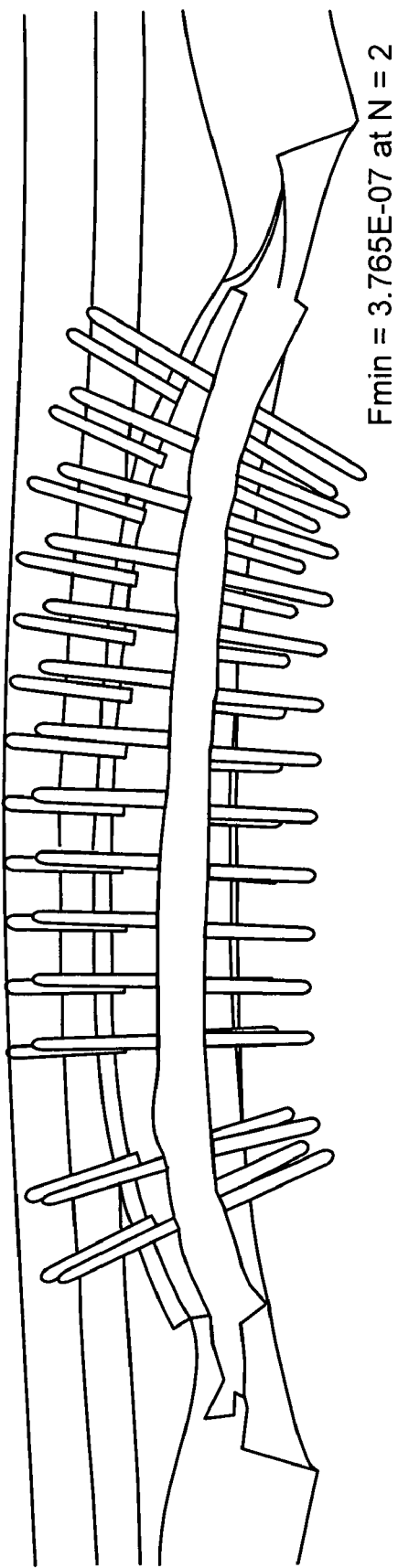
FIG. 7A shows results obtained by calculating deformation at a portion where a feedthrough is in the second embodiment by the finite element method.
Figure 7:
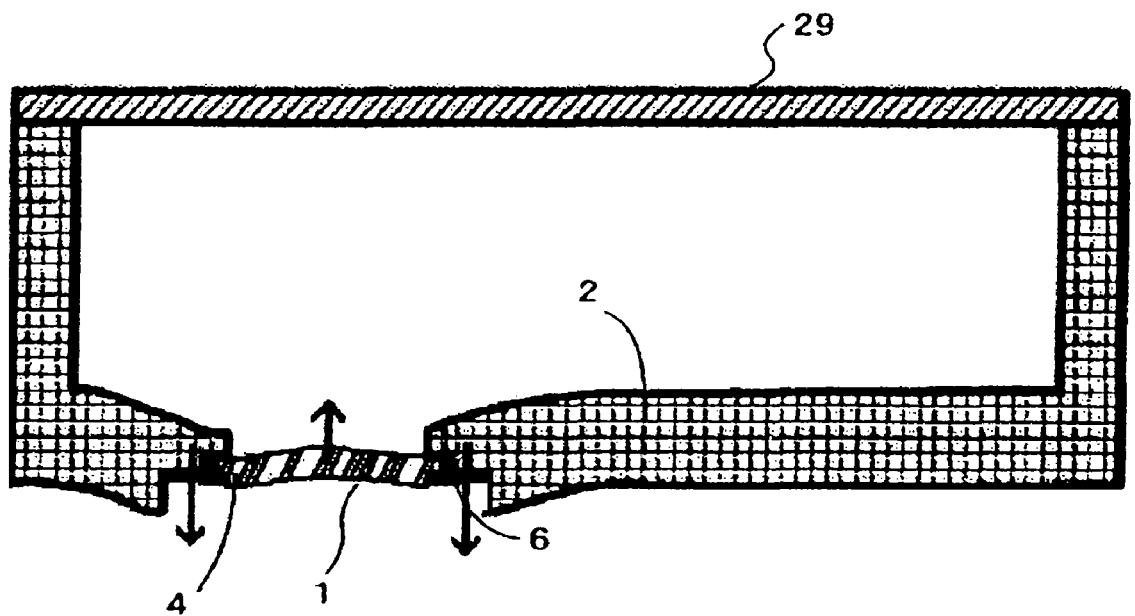
FIG. 7B is a schematic diagram on analytic results in FIG. 7A.

Operation is described in detail with reference to FIGS. 7A and 7B. FIGS. 7A and 7B show the states that the feedthrough 1 and the solder bonding portion 6 are deformed due to a change in temperature. FIG. 7A shows results obtained by the finite element method by calculating deformation for cases where temperature is changed from normal to high. FIG. 7B is a schematic diagram drawn to help readers easily understand analytic results shown in FIG. 7A.

As stated above, the base 2 is subjected to stress caused by the difference in thermal expansion coefficient at a high temperature from the flange, however, the base 2 is precluded from being deformed by the solder bonding portion 6 situated in the position closer to the inside of the device than the center of the thickness of the base 2, so that the stress acts toward the outside of the device rather than toward the center of the thickness of the base. As a result, the base 2 is deformed toward the outside of the device.

On the other hand, the feedthrough 1 is subjected to tensile force by the base 2 through the solder bonding portion 6 at a high temperature, which deforms the feedthrough 1 toward the inside of the magnetic disk device.

Consequently, the base 2 is deformed inversely to the feedthrough 1. The deformation of the base 2 offsets that of the feedthrough 1 to suppress the out-of-plane deformation of the flange 4. As a result of this, stress applied to the solder bonding portion can be suppressed.

As shown in FIG. 7B, situating the portion where the base 2 is bonded to the feedthrough 1 in the position closer to the inside of the device than the center of the thickness of the base suppresses stress applied to the bonding portion with solder low in proof stress as material, thereby preventing the bonding portion from breaking or cracking, which allows sealing performance to be maintained.

Thirdly, a second example of structure of the present invention is described which ensures sealing performance against deformation caused by change in temperature environment when the magnetic disk device is used.

FIG. 5 shows a perspective view of a feedthrough according to the third embodiment.

In the above second embodiment, the deformation of the base 2 offsets that of the feedthrough 2 to suppress the out-of-plane deformation of the flange 4, however, this does not always mean that the out-of-plane deformation thereof is completely suppressed.

For this reason, as shown in FIG. 5, a ditch 9 is provided in the plane that is the periphery of the flange 4 inside the device.

According to the present structure, the deformation of the feedthrough can be restricted to the periphery of the ditch and precluded from extending to the whole area. As a result, stress applied to the solder bonding portion 6 can be further suppressed.

Figure 8A:
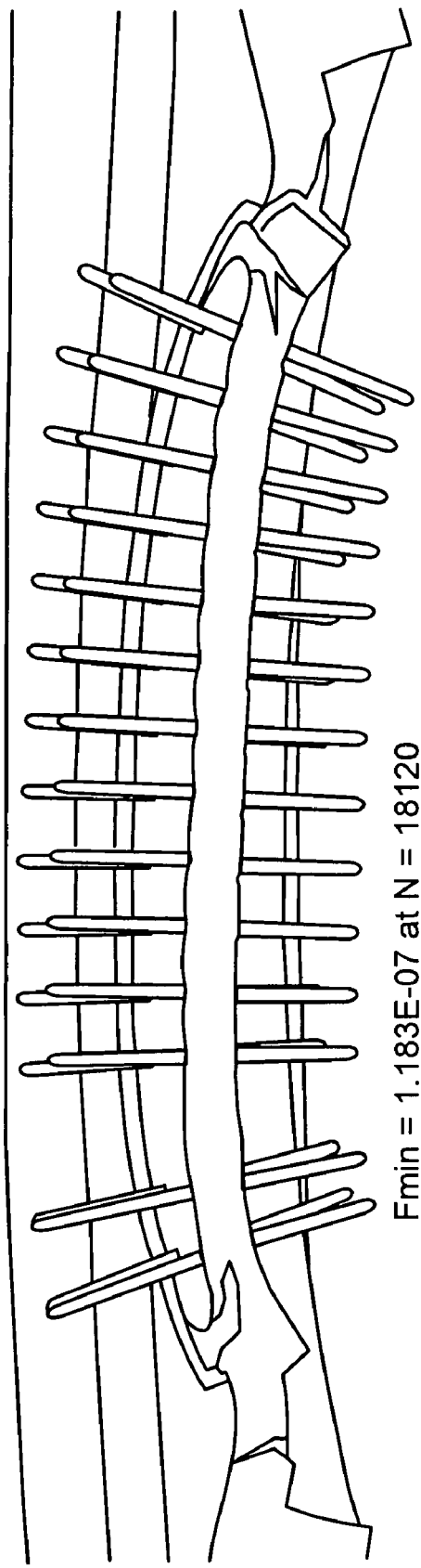
FIG. 8A shows results obtained by calculating deformation at a portion where a feedthrough is mounted in the third embodiment by the finite element method.
Figure 8:
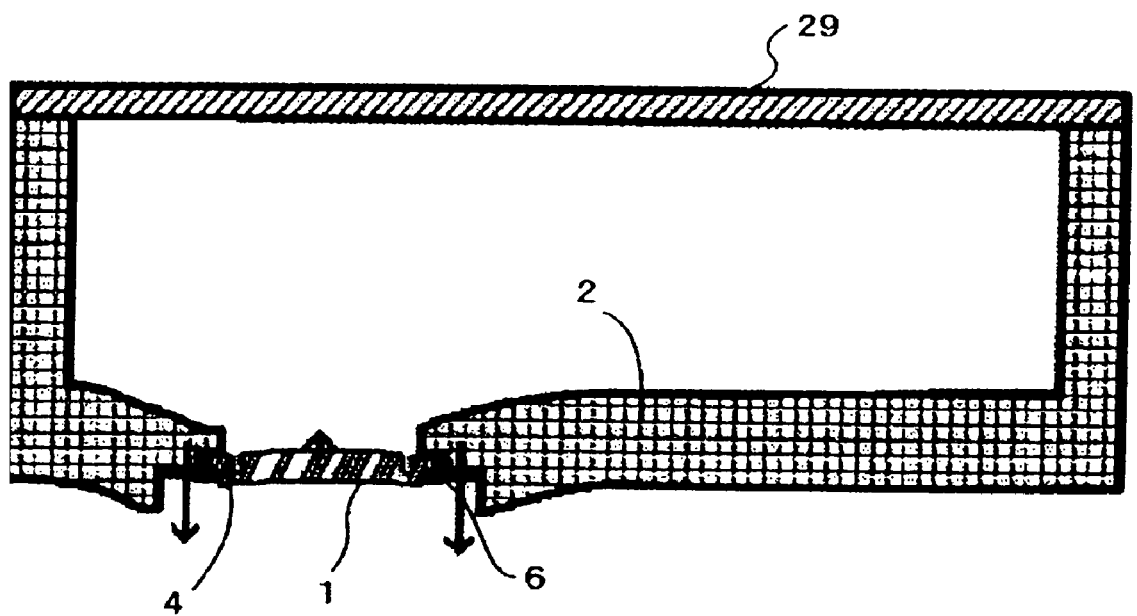
FIG. 8B is a schematic diagram on analytic results in FIG. 8A.

FIGS. 8A and 8B show the states that the feedthrough 1 and the solder bonding portion 6 are deformed due to a change in temperature. FIG. 8A shows results obtained by the finite element method by calculating deformation for cases where temperature is changed from normal to high. FIG. 8B is a schematic diagram drawn to help readers easily understand analytic results shown in FIG. 8A.

From FIGS. 8A and 8B, it can be seen that stress applied to the feedthrough 1 is absorbed by the ditch 9 of the feedthrough 1 to suppress the deformation of the flange 4.

Incidentally, while FIGS. 8A and 8B show the states that the ditch 9 is provided in the feedthrough 1 according to the second embodiment, the ditch can also be provided in the feedthrough 1 according to the above first embodiment. In that case, the deformation of flange 4 of the feedthrough 1 can be further suppressed compared to that in the first embodiment.

Figures 9, 10:
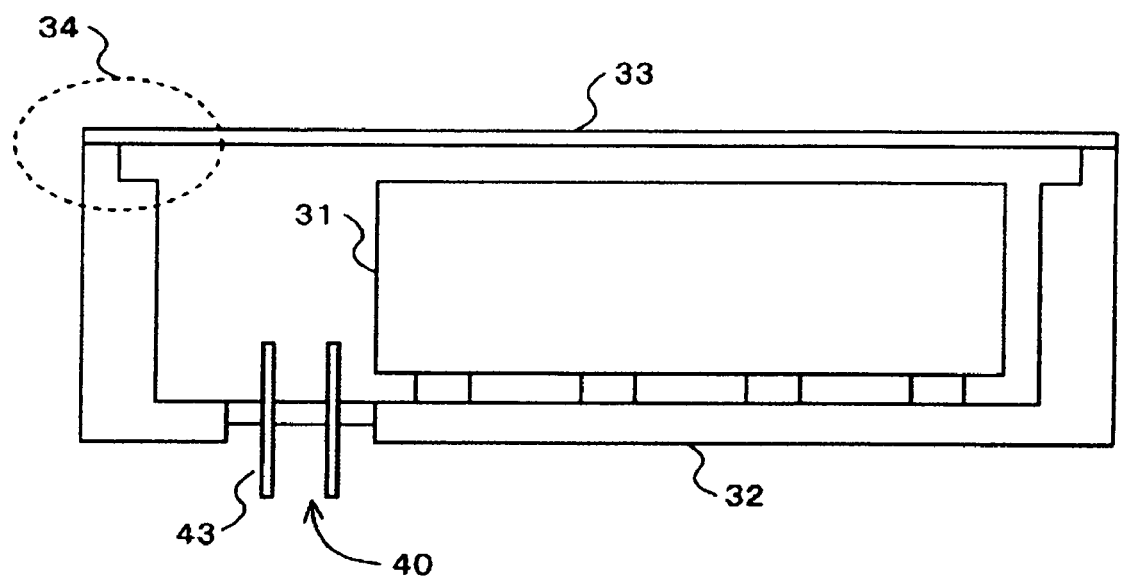
FIG. 9 is a comparative table showing results obtained by calculating stress applied to the solder bonding portion and the glass sealing portion by the finite element method.
FIG. 10 is a cross section of a conventional hermetically sealed magnetic disk device.
Figure 11:
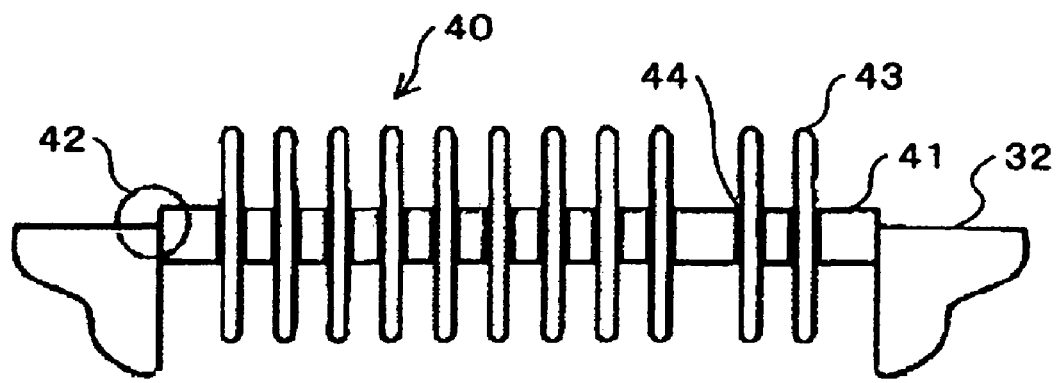
FIG. 11 a side view showing a portion where a conventional feedthrough is mounted.
Figure 12:
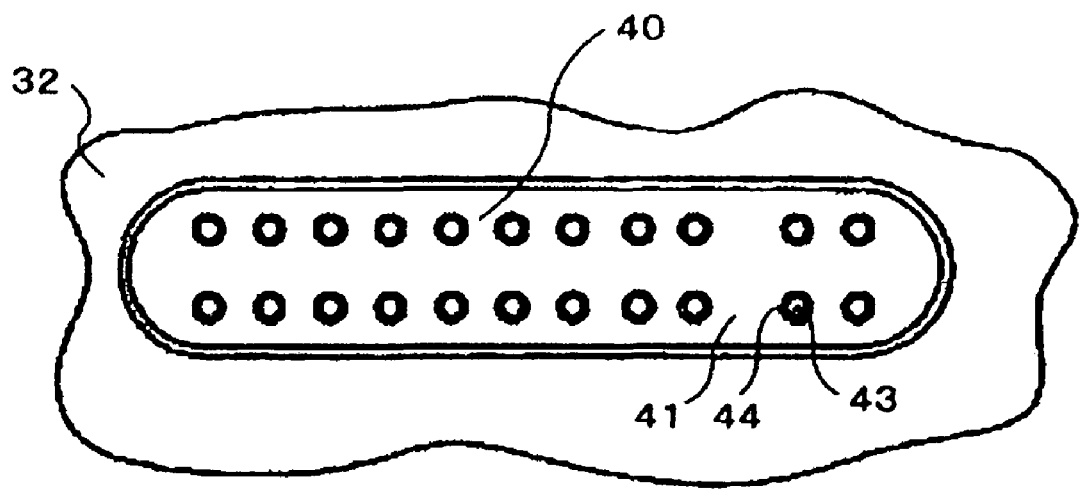
FIG. 12 a top view showing a portion where a conventional feedthrough is mounted.

FIG. 9 shows results obtained by calculating stress applied to the solder bonding portion 6 and the sealing material (glass) 5 at a high temperature by the finite element method. In the figure, the numeral 1 in parentheses (1) denotes calculating results in the first embodiment shown in FIGS. 6A and 6B; (2), calculating results in the second embodiment shown in FIGS. 7A and 7B; and (3), calculating results in the third embodiment shown in FIGS. 8A and 8B. The results represent relative values with respect to those of the numeral (1) taken to be 100. As can be seen from the figure, stresses applied to the solder bonding portion 6 and the glass 5 in the numerals (2) and (3) are smaller than that in the numeral (1).

As described above, embodiments of the present invention are able to reduce force applied to the magnetic disk device from the outside and stress applied to the solder bonding portion resulting from deformation caused by change in temperature environment when the magnetic disk device is used, which greatly improves bonding reliability at the sealed portion.

Furthermore, a completely hermetically sealed helium-environment enables speedy and accurate positioning control of a magnetic head with saved electric power, sufficient quietness and, in a case where saving electric power is not taken into consideration, permits the high-speed rotation of the disk or the high-speed drive of a head gimbal assembly.

Still furthermore, a completely hermetically sealed housing permits eliminating the influence of change in atmospheric pressure and humidity on the HDA and preventing motor oil in the HDA from oxidizing and degrading.

What is claimed is:

1. A magnetic disk device comprising:
   a disk;
   a spindle motor which rotationally drives the disk;
   a head which records and reproduces information on the disk;
   an actuator assembly which moves the head over the disk in the direction of the radius thereof;
   a base provided with the head, spindle motor and actuator assembly and an FPC assembly which performs an electrical connection;
   an opening in the base;
   a cover;
   a weld configured to hermetically seal the cover to the base;
   a space between the cover and the base configured to enclose the magnetic disk device;
   a low-density gas configured to fill the space between the cover and the base;
   a feedthrough comprising,
      pins to electrically connected to the FPC assembly;
      a flange of the feedthrough configured to be larger in outer shape than the opening of the base and configured to be connected to the outside of the opening of the base; and
      a sealing material configured to hermetically seal the pins to the flange, wherein the sealing material is selected from a group of sealing material consisting of: glass or ceramic; and
   solder configured to connect the flange to the feedthrough to the outside of the opening of the base.

2. The magnetic disk device according to claim 1, wherein a mounting plane of the base is one of steps fanned toward the outside of the device when viewed from the opening.

3. The magnetic disk device according to claim 1, wherein the flange has a ditch on the plane of the periphery thereof inside the device.

4. The magnetic disk device according to claim 1, wherein the base is made of aluminum die-cast, the flange is made of nickel alloy, stainless steel or spec and the sealing material is made of glass or ceramic.

5. The magnetic disk device according to claim 1, wherein the low-density gas is helium.

6. A magnetic disk device comprising:
   a disk;
   a spindle motor which rotationally drives the disk;
   a head which records and reproduces information on the disk;
   an actuator assembly which moves the head over the disk in the direction of the radius thereof;
   a base provided with the head, spindle motor and actuator assembly and an FPC assembly which performs an electrical connection;
   an opening in the base;
   a cover;

a bond configured to hermetically seal the cover to the base;

a space between the cover and the base configured to enclose the magnetic disk device;

a low-density gas configured to fill the space between the cover and the base;

a feedthrough comprising,
   pins to electrically connected to the FPC assembly;
   a flange of the feedthrough configured to be larger in outer shape than the opening of the base and configured to be connected to the outside of the opening of the base; and
   a sealing material configured to hermetically seal the pins to the flange, wherein the sealing material is selected from a group of sealing material consisting of: glass or ceramic; and solder configured to connect the flange to the feedthrough to the outside of the opening of the base.

7. The magnetic disk device according to claim 6, wherein a mounting plane of the base is one of steps fanned toward the outside of the device when viewed from the opening.

8. The magnetic disk device according to claim 6, wherein the flange has a ditch on the plane of the periphery thereof inside the device.

9. The magnetic disk device according to claim 6, wherein the base is made of aluminum die-cast, the flange is made of nickel alloy, stainless steel or spec and the sealing material is made of glass or ceramic.

10. The magnetic disk device according to claim 6, wherein the low-density gas is helium.

* * * * *